US005913585A

United States Patent [19]

Pelland

[11] Patent Number: 5,913,585

[45] Date of Patent: Jun. 22, 1999

[54] MEASUREMENT DEVICE AND METHOD OF CONSTRUCTING SUCH DEVICE

[75] Inventor: Jon Pelland, Random Lake, Wis.

[73] Assignee: Intectron, Inc., Kohler, Wis.

[21] Appl. No.: 08/819,439

[22] Filed: Mar. 17, 1997

[51] Int. Cl.[6] .......... G05D 23/00; B42D 15/00

[52] U.S. Cl. .......... 33/704; 33/1 B; 33/1 BB; 33/623

[58] Field of Search .......... 33/704, 1 B, 1 BB, 33/702, 703, 623, 562

[56] References Cited

U.S. PATENT DOCUMENTS

| | | | |
|---|---|---|---|
| 1,267,055 | 5/1918 | Cathcart . | |
| 2,034,529 | 3/1936 | Olsen . | |
| 2,378,249 | 6/1945 | Ruth . | |
| 2,380,267 | 7/1945 | Ruth . | |
| 2,413,198 | 12/1946 | Stewart . | |
| 2,444,723 | 7/1948 | Bowen . | |
| 2,643,326 | 6/1953 | Knapp . | |
| 3,355,810 | 12/1967 | Franklin . | |
| 3,410,994 | 11/1968 | Facto . | |
| 3,532,018 | 10/1970 | Szabo . | |
| 3,704,067 | 11/1972 | Womack . | |
| 4,507,714 | 3/1985 | Aschinger et al. . | |
| 4,769,747 | 9/1988 | Parrillo . | |
| 5,027,527 | 7/1991 | Dorris | 33/704 |
| 5,673,490 | 10/1997 | Hill | 33/1 B |

FOREIGN PATENT DOCUMENTS

| | | | |
|---|---|---|---|
| 366078 | 4/1939 | Italy | 33/623 |
| 937351 | 9/1963 | United Kingdom . | |
| 1048521 | 11/1966 | United Kingdom . | |

OTHER PUBLICATIONS

Quick Skan brochure, 8 pages, Apr. 1992.

*Primary Examiner*—Christopher W. Fulton
*Attorney, Agent, or Firm*—Richard C. Litman

[57] ABSTRACT

A measurement device such as a sheet dimension gauge and a method of constructing a gauge which does not require recalibration. The preferred embodiment includes a frame having a transparent top wall with overlaid measurement lines thereon, a measurement guide, a light source, a heater, a thermostat, and a fan. The frame and the transparent top wall are constructed of a material whose dimensions are not susceptible to changes in humidity, but are susceptible to changes in temperature. Therefore, a temperature control system is used during manufacture and operation of the gauge to ensure that the sheet dimension gauge is properly calibrated. A fan, a thermostat, and a heater are mounted within the frame to maintain a uniform temperature inside of the frame slightly above the highest anticipated ambient temperature created by the lights. A one piece measurement guide, which is used to hold the sheet of paper being measured, is rigidly attached to either the frame or the transparent wall. The measurement lines are overlaid onto the transparent wall in a properly calibrated position relative to the measurement guide. The measurement lines are mounted while the frame and the transparent wall are in the heated state in order to ensure the accuracy of the sheet dimension gauge. The gauge is also provided with a cover to protect the measurement lines.

15 Claims, 2 Drawing Sheets

MEASUREMENT DEVICE AND METHOD OF CONSTRUCTING SUCH DEVICE

BACKGROUND OF THE INVENTION

1. Field of the Invention

The present invention relates generally to improvements in measuring devices that utilize background lighting and methods of constructing such measuring devices. More specifically, the invention relates to a device such as a sheet dimension gauge and a method of constructing a sheet dimension gauge which does not require recalibration.

2. Description of Related Art

Many measuring devices that utilize background lighting rely on the accuracy of the measurement lines which are generally overlaid onto a transparent surface one flaw in such measuring devices is that the heat generated by the lights may cause the device to be inaccurate. The heat generated from the lights cause the transparent surface to expand, such expansion often occurring in an uneven manner due to hot spots on the transparent surface. Many of these devices have frames that are constructed of materials which expand and contract due to changes in humidity, which further adds to their inaccuracy. Even frequent recalibration will not ensure that the device is accurate.

One such measuring device is a paper dimension gauge which is used to quickly and easily check whether a sheet of paper is manufactured to the proper specifications. Some manufacturers claim to produce paper dimension gauges which can measure to within 0.002 inches. However, many paper dimension gauges are constructed of several different types of materials which are supposed to act in unison to measure a sheet of paper. Unfortunately, many paper dimension gauges are constructed of materials whose dimensions are susceptible to changes in humidity and temperature. Therefore, any slight fluctuation in temperature and humidity has an affect on the paper dimension gauge's calibration and can potentially destroy the gauge's accuracy.

The present invention is directed at solving the perceived need for a measuring device, such as sheet dimension gauges used to measure paper, film, or other materials, and a method of constructing a measuring device such that the device does not require recalibration. The measuring device should be constructed of materials whose dimensions are not susceptible to changes in humidity. The measuring device should also be capable of maintaining a uniform and constant predetermined temperature during operation and the device should be constructed and originally calibrated at that temperature to ensure proper calibration. The measurement device should have a one piece measurement guide rigidly mounted on the device in relation to the measurement lines in order to maintain the correct calibration. The measuring device should also include a protective cover to prevent the measurement lines from becoming damaged.

The following publications describe devices which utilize background lighting. U.S. Pat. No. 1,267,055, issued on May 21, 1918, to Robert M. Cathcart; U.S. Pat. No. 2,034,529, issued on Mar. 17, 1936, to Oswald A. Olsen; U.S. Pat. No. 2,378,249, issued on Jun. 12, 1945, to Roger A. Ruth; U.S. Pat. NO. 2,380,267, issued on Jul. 10, 1945, to Roger A. Ruth; U.S. Pat. No. 2,413,198, Dec. 24, 1946, to James A. Stewart; U.S. Pat. No. 2,444,723, issued on Jul. 6, 1948, to Everette F. Bowen; U.S. Pat. NO. 2,643,326, issued on Jun. 23, 1953, to Joseph F. Knapp; U.S. Pat. No. 3,355,810, issued on Dec. 5, 1967, to Earl W. Franklin; U.S. Pat. No. 3,410,994, issued on Nov. 12, 1968, to Louis A. Facto; U.S. Pat. NO. 3,532,018, issued on Oct. 6, 1970, to Francis S. Szabo; U.S. Pat. No. 3,704 067, issued on Nov. 28, 1972, to William R. Womack; U.S. Pat. No. 4,507,714, issued on Mar. 26, 1985, to William T. Aschinger et al.; U.S. Pat. No. 4,769,747, issued on Sep. 6, 1988, to Louis C. Parrillo; United Kingdom Patent Application Number 937,351, published on Sep. 18, 1963; United Kingdom Patent Application Number 1,048,521, published on Nov. 16, 1966.

The above listed publications fail to describe the benefits of a temperature control system within the device for maintaining the accuracy of the device and the benefits of manufacturing the measuring surface at the device's operating temperature. The above listed publications also fail to describe the benefits of using material whose dimensions are not susceptible to changes in humidity. They also fail to describe the benefits of using a cover to protect the measurement surface of the device.

For general information on paper dimension gauges, a product brochure by QUICK SKAN, 826 South Fairview, Park Ridge, Ill. 60068 shows several models of paper dimension gauges. Additionally, the inventor has knowledge of the existence of a paper dimension gauge with an aluminum frame manufactured in Germany.

None of the above inventions and patents, taken either singularly or in combination, is seen to describe the instant invention as claimed. Thus a measurement device and method of constructing such device solving the aforementioned problems is desired.

SUMMARY OF THE INVENTION

The present invention relates to measuring devices such as a sheet dimension gauge which is used as a quality control device to determine the accuracy of the dimensions to which paper, film, or other materials are cut. The present invention relates to a sheet dimension gauge and a method of constructing a gauge which does not require recalibration.

The preferred embodiment of the present invention includes a frame having a transparent top wall with overlaid measurement lines thereon, a measurement guide, a light source, a heater, a thermostat, and a fan. The frame and the transparent top wall are constructed of a material whose dimensions are not susceptible to changes in humidity. The dimensions of the frame and the transparent top wall are, however, susceptible to changes in temperature. Therefore, a temperature control system is used during manufacture and operation of the gauge Lo ensure that the sheet dimension gauge is properly calibrated.

In the preferred embodiment of the present invention a pair of elongated light emitting devices are mounted within the frame parallel to one another and separated by a baffle wall. A fan is mounted within the frame such that a flow of air is created over the light emitting devices and around the baffle wall. A thermostat is mounted to the frame upstream of the fan and a heater is mounted to the frame downstream of the fan. The thermostat controls the heater so that the inside of the frame is maintained at a uniform temperature slightly above the highest anticipated ambient temperature created by the light emitting devices.

A one piece measurement guide which is used to hold paper being measured is rigidly attached to either the frame or the transparent wall. The measurement lines are then overlaid onto the transparent wall in a properly calibrated position relative to the measurement guide. The measurement lines are mounted while the frame and the transparent wall are in the heated state in order to ensure the accuracy of the sheet dimension gauge.

The device is also provided with a protective cover which is preferably a rectangular plastic sheet hingedly attached to the frame. The cover may be folded back over the transparent wall while the sheet dimension gauge is not being used in order to protect the measurement lines from damage.

Accordingly, it is a principal object of the invention to provide a measurement device such as a sheet dimension gauge and a method of constructing a sheet dimension gauge which does not require recalibration.

It is another object of the invention to provide a gauge which is constructed and operated at a predetermined temperature.

It is a further object of the invention to provide a gauge having a frame and a transparent wall made of materials whose dimensions are not susceptible to changes in humidity.

Still another object of the invention is to provide a gauge capable of maintaining a uniform and constant predetermined temperature during operation.

A further object of the invention is to provide a gauge with a one piece measurement guide rigidly mounted on the gauge in relation to the measurement lines in order to maintain the correct calibration.

Yet another object of the invention is to provide a gauge with a protective cover to prevent the measurement lines from becoming damaged.

It is an object of the invention to provide improved elements and arrangements thereof in a measurement device and method of constructing such device for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
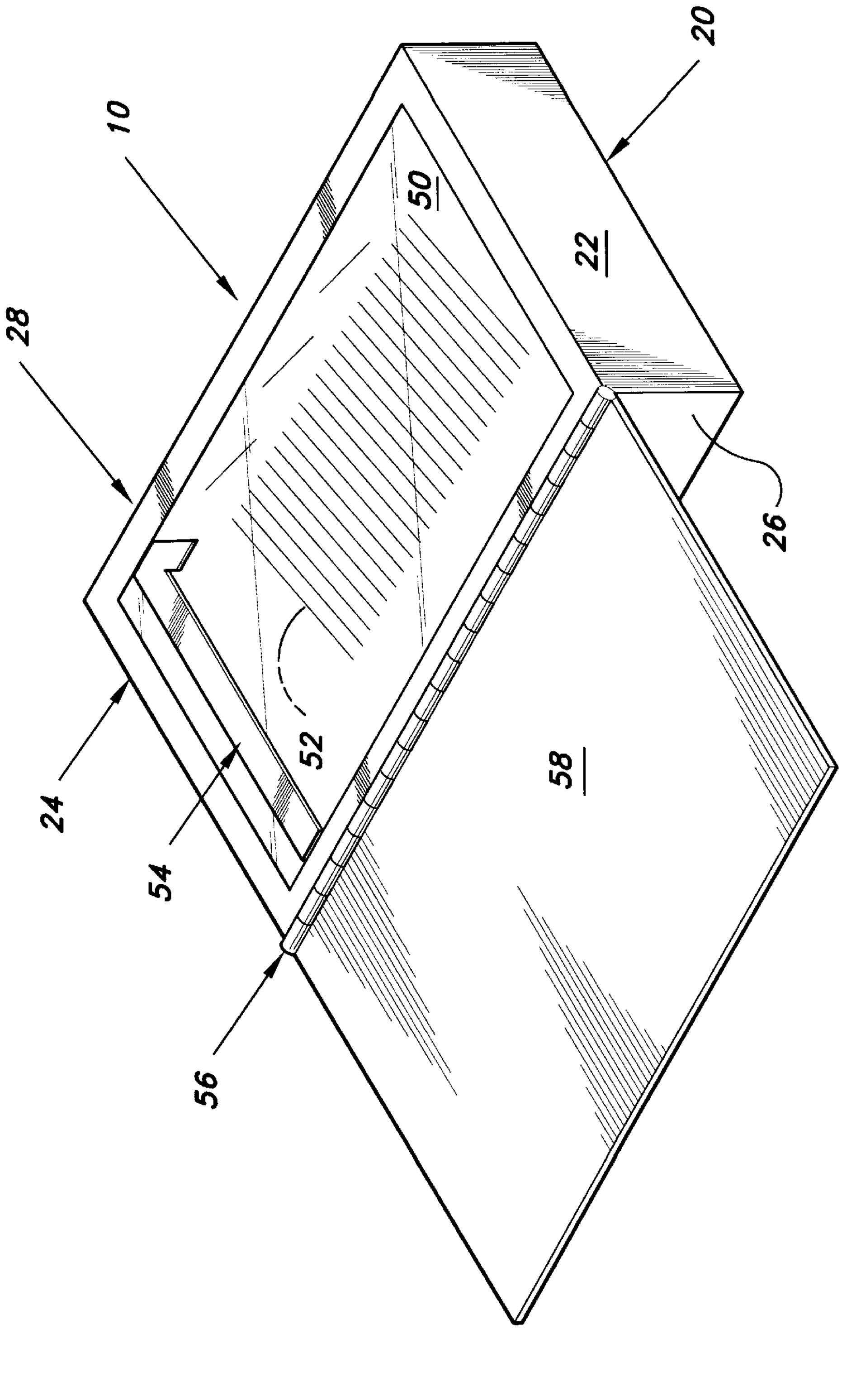
FIG. 1 is a perspective view of a sheet dimension gauge according to the present invention with the protective cover in the open position.
Figure 2:
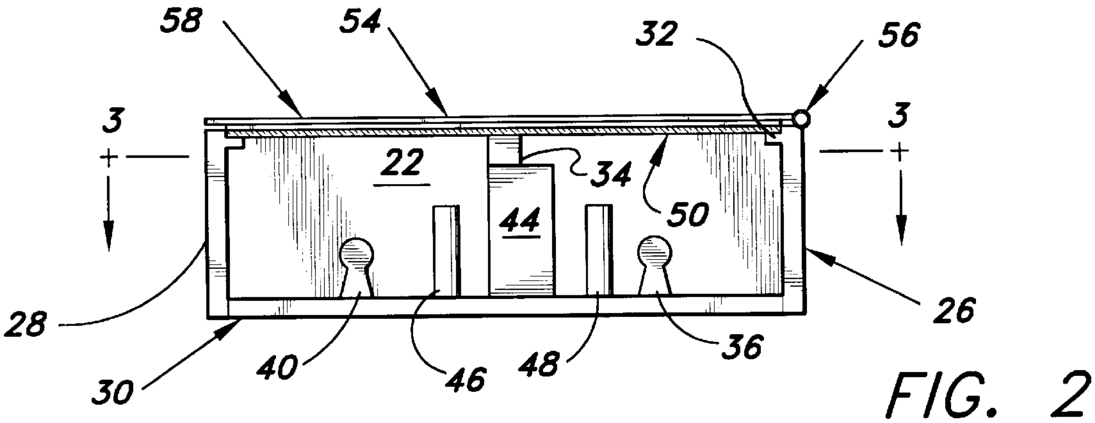
FIG. 2 is a side view of a sheet dimension gauge according to the present invention with a side wall removed to reveal the interior of the sheet dimension gauge.
Figure 3:
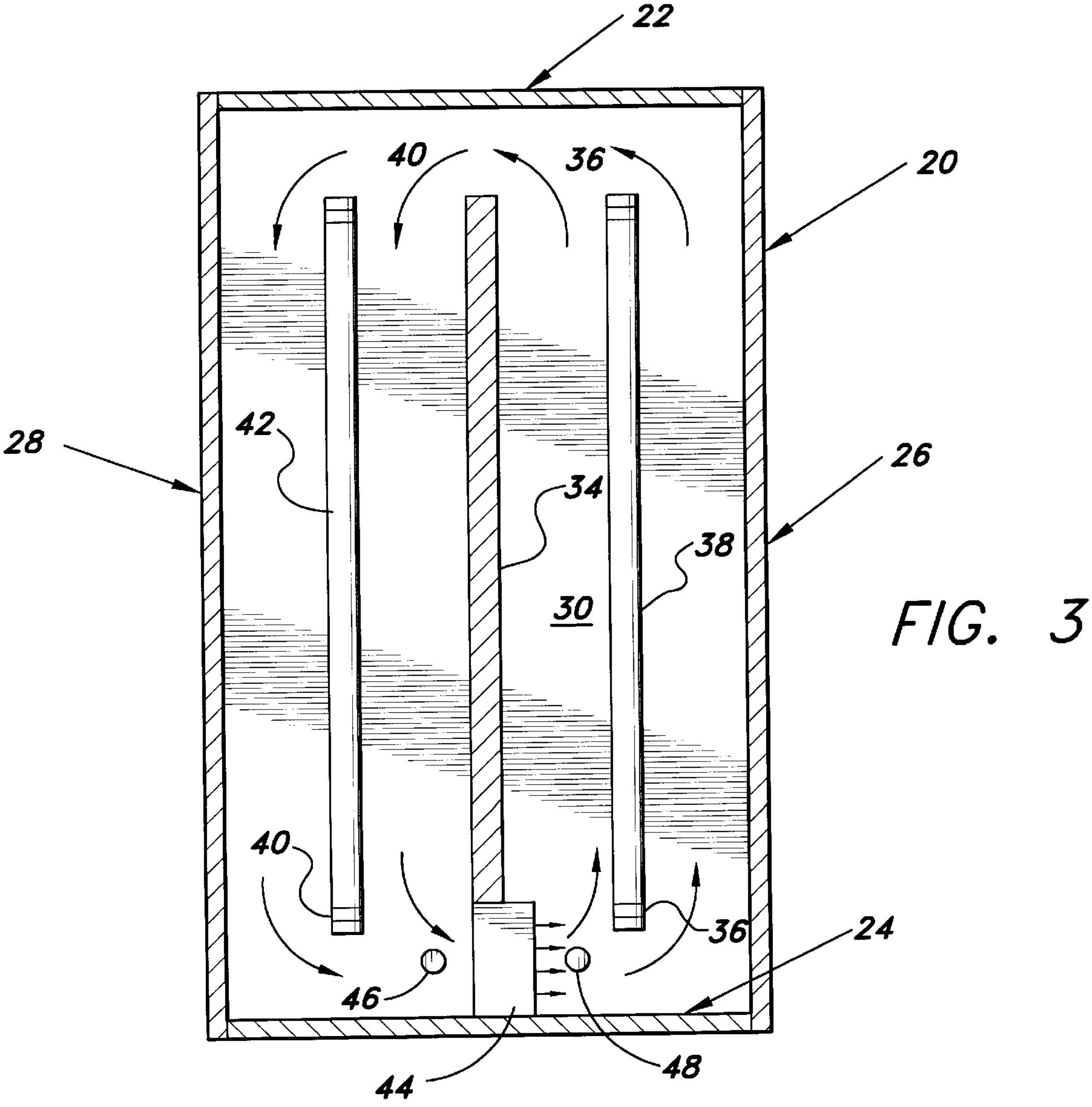
FIG. 3 is a top, cross-sectional view of a sheet dimension gauge according to the present invention along line 3—3 in FIG. 2.

The preferred embodiment of the present invention 10 is shown in FIGS. 1 through 3. The preferred embodiment 10 includes a frame 20 having a transparent top wall 50 with overlaid measurement lines 52 thereon, a measurement guide 54, a pair of elongated lights, 38 and 42, a heater 48, a thermostat 46, and a fan 44.

The preferred embodiment of the frame 20 has four side walls, 22, 24, 26, and 28, and a bottom wall 30. Alternatively, the frame 20 may be constructed in any number of shapes and sizes. The frame 20 is constructed of a material whose dimensions are not susceptible to changes in humidity. The frame 20 is preferably constructed of a metal material, such as aluminum.

The frame 20 has a transparent top wall 50 which sits on a lip 32 that extends from the top of the side walls, 22, 24, 26, and 28. The transparent top wall 50 is rigidly mounted to the frame 20 to form an enclosed chamber within the frame 20. The transparent top wall 50 is constructed of a material whose dimensions are not susceptible to changes in humidity. Preferably, the transparent wall 50 is constructed of glass, or a similar synthetic substance such as PLEXIGLAS®.

In the preferred embodiment of the present invention a pair of elongated light emitting devices, 38 and 42, are mounted within the frame 20 parallel to one another. Conventional fluorescent light bulbs may be used as the light emitting devices, 38 and 42, which are each held in place by a pair of plugs, 36 and 40. The light emitting devices, 38 and 42, are separated by a baffle wall 34. A fan 44 is mounted within the frame 20 such that a flow of air is created over the light emitting devices, 38 and 42, and around the baffle wall 34.

The dimensions of the frame 20 and the transparent top wall 50, while not susceptible to changes in humidity, are susceptible to changes in temperature. Therefore, a temperature control system is used during manufacture and operation of the present invention 10 to ensure that the sheet dimension gauge has a consistent calibration during use. The measurement lines 52 should be overlaid on the transparent top wall 50 when the temperature control system is running at its normal predetermined operating temperature to ensure proper calibration.

The preferred embodiment of the present invention 10 utilizes a thermostat 46, a heater 48, and a fan 44, to control the temperature within the frame 20. It is contemplated that numerous other temperature control systems may be used with the present invention to achieve a comparable result. In the preferred embodiment a thermostat 46 is mounted to the frame 20 upstream of the fan 44 and a heater 48 is mounted to the frame 20 downstream of the fan 44. The thermostat 46 electronically controls the heater 48 so that the inside of the frame 20 is maintained at a uniform predetermined temperature slightly above the highest anticipated ambient temperature created by the light emitting devices, 38 and 42. The temperature control system has the capability of eliminating most of the hot spots on the transparent top wall 50 created by the light emitting devices, 38 and 42.

A one piece measurement guide 54 is used to hold sheets of paper, film, or other materials in the correct position while they are being measured. The measurement guide 54 is rigidly attached to either the frame 20 or the transparent wall 50. It is important that if the measurement guide 54 is mounted to the frame 20 then the frame 20, the transparent top wall 50, and the measurement guide 54, must be held firmly in a fixed relation to each other in order to ensure the continued proper calibration of the gauge 10. Once the measurement guide 54 is properly mounted and the device 10 is brought up to the predetermined operating temperature, then the measurement lines 52 are overlaid onto the transparent wall 50 in a properly calibrated position relative to the measurement guide 54.

The preferred method of mounting the measurement guide 54 includes placing an adhesive between the transparent top wall 50 and the measurement guide 54. Additionally, one or more holes (not shown) should be placed through the transparent top wall 50 and the measurement guide 54 so that a conventional nut and bolt (not shown) may be used to clamp them together.

The device is also provided with a protective cover 58 which is preferably a rectangular plastic sheet attached to the frame 20 by hinge 56. The cover 58 may be folded back over the transparent wall 50 while the sheet dimension gauge 10 is not being used in order to protect the measurement lines 52 from damage.

It is contemplated that the present invention may also be used to ensure the accuracy of other measurement devices which utilize background lighting.

It is to be understood that the present invention is not limited to the embodiments described above, but encompasses any and all embodiments within the scope of the following claims.

I claim:

1. A measurement device, comprising:

a frame having a bottom wall and a side wall;

a transparent wall rigidly mounted to said side wall positioned opposite to said bottom wall, thereby forming a substantially enclosed chamber;

a measurement line overlaid on said transparent wall;

means for emitting light attached to said frame within said chamber; and means for maintaining a predetermined temperature within said chamber, comprising:

a heater attached to said frame within said chamber, a thermostat attached to said frame within said chamber, said thermostat being capable of controlling said heater, and a fan attached to said frame within said chamber.

2. The measurement device as defined in claim 1, further comprising a measurement guide rigidly mounted to said frame.

3. The measurement device as defined in claim 1, further comprising a measurement guide rigidly mounted to said transparent wall.

4. The measurement device as defined in claim 3, wherein said measurement guide is rigidly mounted to said transparent wall by an adhesive material.

5. The measurement device as defined in claim 4, further comprising:

said measurement guide having a hole therethrough;

said transparent wall having a different hole therethrough and aligned in registry with said hole;

a bolt having external threads thereon, said bolt extending through said hole in said measurement guide and said hole in said transparent wall; and a nut is threadably received by said bolt thereby rigidly mounting said measurement guide to said transparent wall.

6. The measurement device as defined in claim 1, wherein said frame is constructed of a material whose dimensions are not susceptible to changes in humidity.

7. The measurement device as defined in claim 6, wherein said frame is constructed of aluminum.

8. The measurement device as defined in claim 1, wherein said transparent wall is constructed of a material whose dimensions are not susceptible to changes in humidity.

9. The measurement device as defined in claim 8, wherein said transparent wall is constructed of glass.

10. The measurement device as defined in claim 1, further comprising a cover hinged to said frame, said cover being sized and positioned to removably cover said measurement line.

11. The measurement device as defined in claim 10, wherein said cover is made of a plastic material.

12. The measurement device as defined in claim 1, wherein said means for emitting light is a pair of elongated fluorescent light bulbs.

13. The measurement device as defined in claim 1, further comprising a baffle wall substantially dividing said frame into two portions and positioned in to the direct path of air created by said fan to force the air to travel around said baffle wall.

14. A method of constructing a measurement device according to claim 1, comprising the steps of:

mounting said measurement guide rigidly to said transparent wall;

bringing said transparent wall to a substantially uniform, predetermined temperature; and overlaying said measurement line on said transparent wall in a proper calibrated relation to said measurement guide.

15. A method of constructing a measurement device according to claim 1, comprising the steps of:

mounting said transparent wall rigidly to said frame;

mounting said measurement guide rigidly to said frame;

bringing said transparent wall and said frame to a substantially uniform, predetermined temperature; and overlaying said measurement line on said transparent wall in a proper calibrated relation to said measurement guide.

* * * * *